June 11, 1968 C. D. GIBSON ET AL 3,387,731

FORK TRUCK

Filed Jan. 4, 1967 5 Sheets-Sheet 1

CHRISTIAN D. GIBSON
STANFORD B. JONES
INVENTORS

BY *Richard G. Stephens*

June 11, 1968 C. D. GIBSON ET AL 3,387,731

FORK TRUCK

Filed Jan. 4, 1967 5 Sheets-Sheet 2

CHRISTIAN D. GIBSON
STANFORD B. JONES
INVENTORS

BY *Richard D. Stephens*

CHRISTIAN D. GIBSON
STANFORD B. JONES
INVENTORS

BY *Richard R. Stephens*

CHRISTIAN D. GIBSON
STANFORD B. JONES
INVENTORS

BY Richard D. Stephens

United States Patent Office 3,387,731
Patented June 11, 1968

3,387,731
FORK TRUCK
Christian D. Gibson and Stanford B. Jones, Greene, N.Y., assignors to The Raymond Corporation, Greene, N.Y., a corporation of New York
Filed Jan. 4, 1967, Ser. No. 607,315
5 Claims. (Cl. 214—700)

ABSTRACT OF THE DISCLOSURE

An arrangement for making power-tilted load forks easily removable and replaceable, in which each fork includes a downwardly facing yoke to rotatably support the fork on a first shaft and an upwardly facing yoke engaging a second shaft so that translation of the second shaft tilts the fork about the axis of the first shaft.

---

This invention relates to material handling machinery, and more particularly, to a novel lift-track fork-carriage assembly which increases the utility of a truck by allowing the same truck to be used to handle both palletized and unpalletized or "slip-sheet" loads, and to be easily and rapidly convertible from one operational configuration to the other.

In most warehouses loads are carried on pallets designed to be handled by lift truck forks having two tines, which are often referred to as two "forks." The space between the inside edges of a typical pair of tines varies from approximately 10 to 30 inches. Rail shipment of various commodities, such as bags of flour, for example, may be done more economically if the bags are not carried on wooden pallets but instead on cardboard sheets (sometimes called "slip sheets") or the like. However, loads of that type, which consist either of plural articles, and various other non-rigid loads, unless mounted on a pallet, obviously will slip between the tines of an ordinary pair of load forks. Accordingly, the load forks used with such "soft" loads ordinarily include a larger number of tines or forks spaced more closely together, in an approach toward providing a continuous surface. While the use of perhaps six tines on a fork carriage allows such loads to be handled on cardboard sheets, the use of so many tines interferes with the handling of such a load on conventional wooden pallets. The construction of many pallets simply does not allow entry of a multi-tine fork assembly. Some other pallets theoretically might be engaged by multi-tine forks, but only with extreme care by the operator.

Some known types of multiple-fork attachment devices so increase the length of a given truck that it cannot operate in the narrow aisles provided in many warehouses, while some other known attachments are useful solely on counterbalanced trucks. While it is possible to use a counterbalanced truck with such a prior attachment for unloading a boxcar to place each slip-sheet load on a pallet on a dock, and then to use a conventional indoor "narrow-aisle" truck equipped with a two-tine fork to move each palletized load into the warehouse, the provision of such a counterbalanced truck solely for the purpose of unloading railroad cars often would represent much wasted capital investment. Accordingly, it has become highly desirable to provide a narrow-aisle truck, of the type shown in prior Patents Nos. 2,564,002 and 2,752,058, for example, which may be converted rapidly between two-tine and multi-tine fork configurations. Thus it is a primary object of the present invention to provide a load carriage for a fork lift truck on which the forks are made readily removable and replaceable, so that the truck may be quickly converted between slip-sheet load handling and palletized load handling.

In order to readily "chisel" under most loads mounted on cardboard sheets and the like, it is necessary that the forks be tilted downwardly while the forks are entering under the load, but necessary that the forks be level, or preferably tilted upwardly, while the truck is transporting the load, in order that the forks cradle the load. It is desirable that the forks present a 90-degree angle to the load, in order that each fork support the back of the load. Tilting of load forks has been done in the prior art either by tilting the entire mast of a lift truck, or by tilting the forks relative to the load carriage. Tilting of the mast is not only more complex and expensive, but extremely difficult to provide on a narrow-aisle truck, where the mast is usually a part of basic structure of the truck. In order to chisel under a slip sheet-mounted load, it is frequently necessary that the forks be tilted forwardly with considerable force and not merely by gravity. Another object of the invention is to provide a fork assembly of the type described which is capable of powered fork tilting in both upward and downward directions, without mast tilt being required. Provision of suitable fork mounting and fork tilting apparatus will be seen inherently to tend to interfere with making the forks easily removable and replaceable, and a primary object of the invention is to provide apparatus which satisfies both of these two conflicting requirements.

Other objects of the invention will in part be obvious and will in part appear hereinafter.

The invention accordingly comprises the features of construction, combinations of elements, and arrangements of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
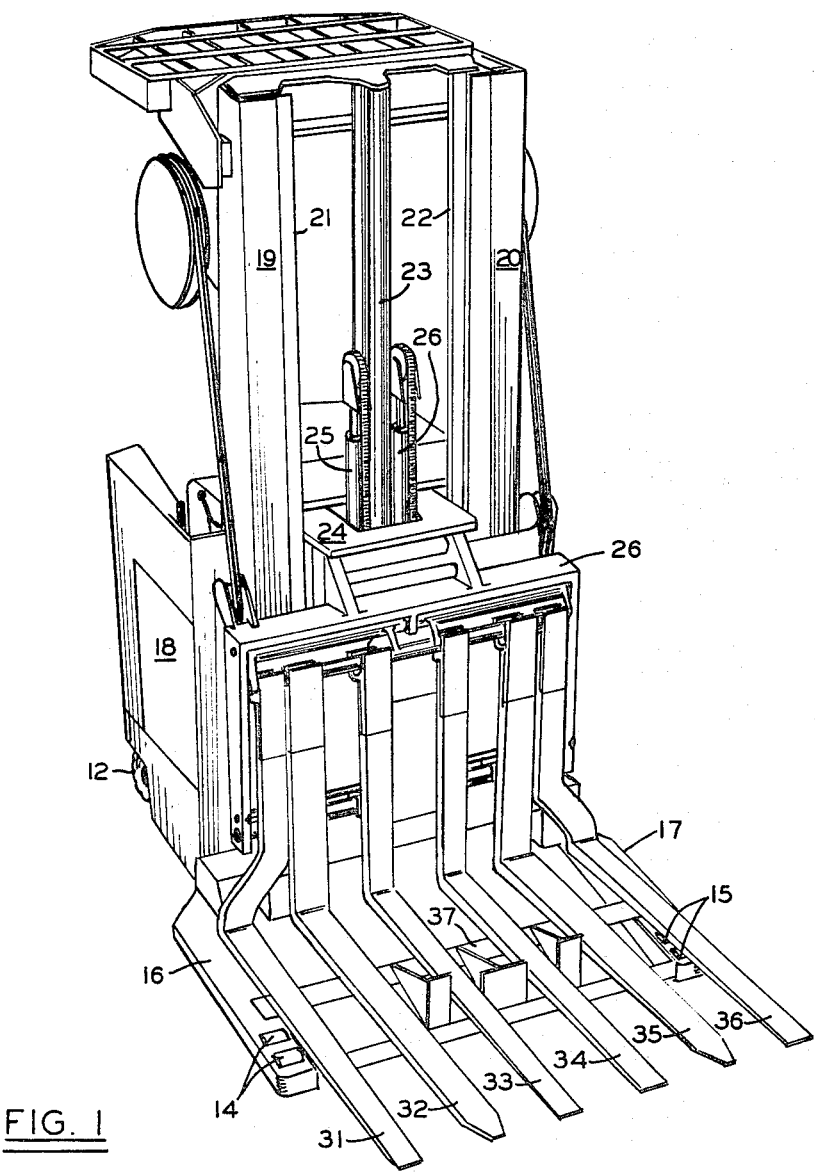
FIG. 1 is a perspective view of a lift truck in which the present invention has been incorporated.

FIG. 1 shows the general arrangement of one embodiment of the invention incorporated on a lift truck. The truck comprises a base frame carried on one or more dirigible drive wheels 12, only one of which is shown in FIG. 1, and a pair of non-steerable load-carrying front wheel assemblies 14 and 15 mounted on straddle arms 16 and 17 which project forwardly from the base of the truck. An operator's platform, various control apparatus, and the truck electrical storage battery (mounted within compartment 18) are all carried on the main base frame of the truck, together with a mast or gallows formed by a pair of inwardly facing channel members 19 and 20. A pair of telescopic uprights shown as comprising I-shapes 21 and 22 are nested within channels 19 and 20 and are hoisted and lowered by means of hydraulic cylinder 23. A rectangular frame or carriage 24 is carried on rollers (not shown) within tracks formed by the inner flanges of I-beams 21 and 22, and a further pair of hydraulic cylinders 25 and 26 serve to raise and lower carriage 24 with respect to telescopic I-shape uprights 21 and 22. Mounted to load carriage 24 by means of a scissors reach mechanism is fork carriage assembly 26. The reach mechanism may comprise an arrangement of the type shown in either Patent 2,752,058 or Patent 3,082,894. Fork carriage assembly 26 carries a plurality of tines or "forks" 31 through 36, all of which are arranged to be rapidly removable or attachable to convert between slip sheet handling and palletized handling. Ordinarily, only four forks (31, 33, 34 and 36) are removed and replaced, and forks 32 and 35 are left in place. Fork carriage assembly 26 also carries mechanism to be described which allows all of the forks to be tilted under power either upwardly or downwardly. Shown in FIG. 1 extending between and connected to straddle arms 16 and 17 in FIG. 1 is a comb member 37 which per se is not a part of the present invention but which is particularly useful in trucks of the type shown in FIG. 1 which incorporate the present invention, and which is described in detail and claimed in application Ser. No. 607,316, filed on even date herewith by Christian D. Gibson.

Referring now to FIGS. 2–7, fork carriage assembly 26 may be seen to comprise a rigid frame including a top cross plate 39, right and left side plates 40 and 41, and right and left back plates 42, 43. Welded to back plates 42 and 43 are a pair of guide blocks 44 and 45 (FIGS. 3–5) provided with slots 46, 47 which accommodate rollers (not shown) of a lazy-tongs type of reach mechanism disclosed in detail in prior Patents Nos. 2,752,058 and 3,082,894, and yokes 38, 38 (FIGS. 2–4) at the top of the fork carriage similarly attach to other portions of the reach mechanism. Intermediate plates 60 and 61 (FIG. 2) extend forwardly from back plates 42 and 43 to which they are welded, to provide a box-like frame in which various shafts to be mentioned are supported.

Figure 2:
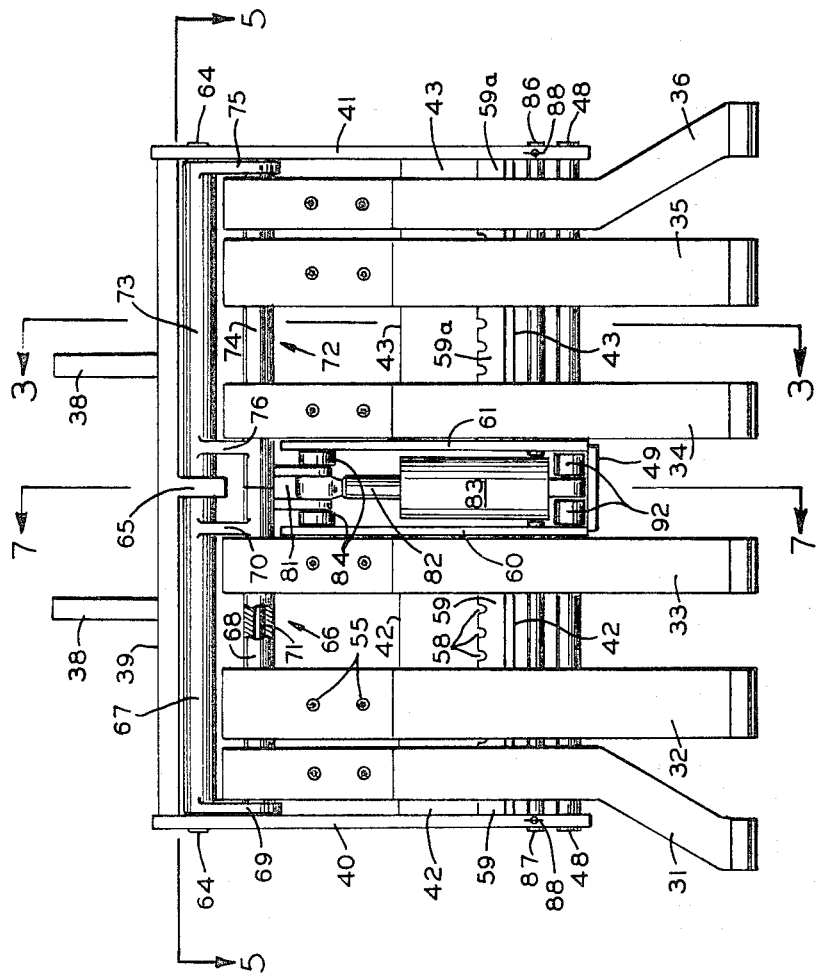
FIG. 2 is a front view of the fork carriage assembly of the truck of FIG. 1, with the assembly shown fitted with six tines, all of which are removable.
Figure 6:
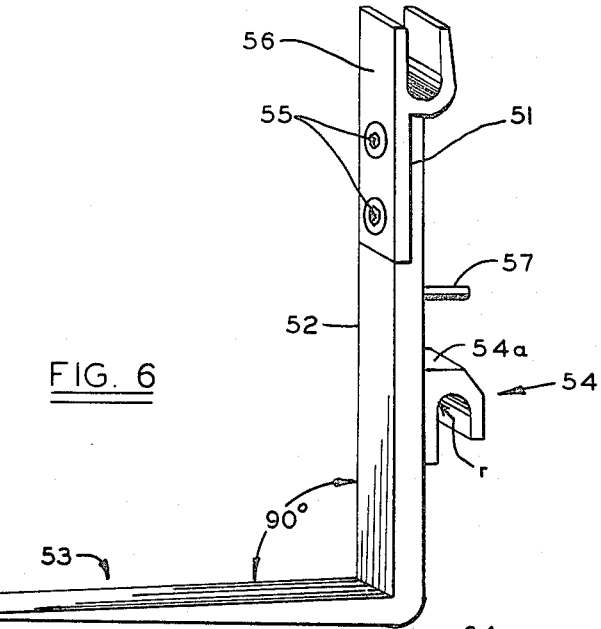
FIG. 6 is an isometric view of a typical removable fork.
Figure 7:
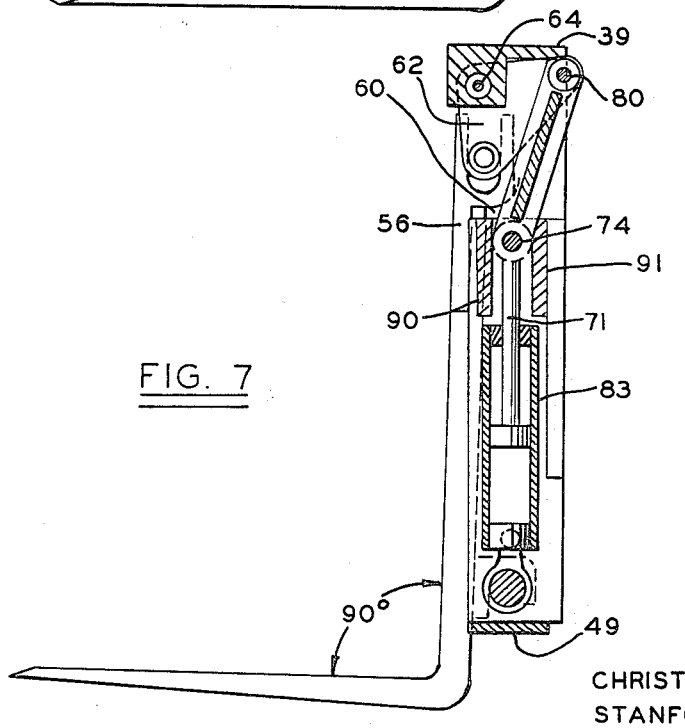
FIG. 7 is a section view taken at lines 7—7 in FIG. 2, except that the fork assembly is shown in its maximum upward tilt position.

As shown in FIG. 2, a heavy round fork hanger bar 48 extends through intermediate plates 60 and 61, and all the way between side plates 40 and 41 at a level near the bottom of the fork carriage assembly. Forks 31–36 are each removably hung on hanger bar 48. A typical one of forks 31–36 is shown in FIG. 6 to include a generally vertical back portion 52 and a tapered generally horizontal lower or tip portion 53. As indicated in FIG. 6, the angle between the front surface of fork back 52 and the upper face of portion 53 is substantially 90 degrees. Hanger block 54 is welded on the back side of back portion 52 of the fork and comprises a downwardly facing yoke with a radius $r$ to fit on fork hanger bar 48. The upper end of each removable fork is provided with an upwardly facing yoke member 56 which is preferably made in a separate piece from the main body of the fork, and then attached thereto, as by means of bolts 55, 55, for example, with suitable shims being provided, if desired, in the joint 51 between the two pieces. As will become more clear as the description proceeds, insertion of selected shims in the joints 51 of the various forks allows all of the fork tips to be mutually aligned precisely even though the angles of the individual forks may vary slightly from 90 degrees.

It will be appreciated that the forks, though they must be tiltable by rotation about hanger 48, must not be allowed to translate laterally along hanger bar 48.

Figure 3:
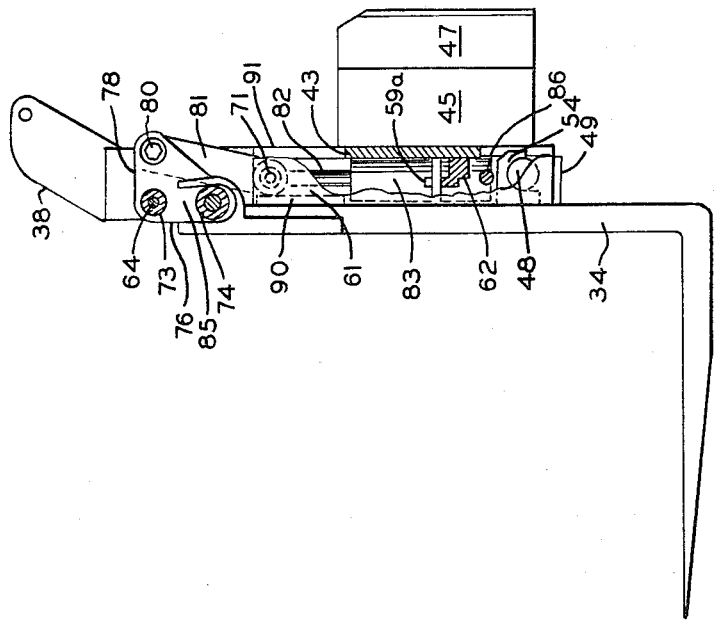
FIG. 3 is an elevation view of the fork carriage assembly taken along lines 3—3 of FIG. 2, with certain parts shown cut away for clarity.

A pin 57 extends rearwardly from the back 52 of the fork. Pin 57 rests in one of grooves 58, 58 in either bar 59 or bar 59a (FIG. 2), to prevent sidewise movement of fork 50 on hanger bar 48, with each pin sliding inwardly and outwardly of a groove 58 as the forks tilt, as best seen by the two different fork tilt positions shown in FIGS. 3 and 4. As best seen in FIG. 3, bar 59a is supported from back plate 43 by means of a spacer block 62, and extends between end plate 41 and intermediate plate 61, with grooves 58 provided along its length to provide a variety of lateral positions at which a given fork may be located.

Figure 4:
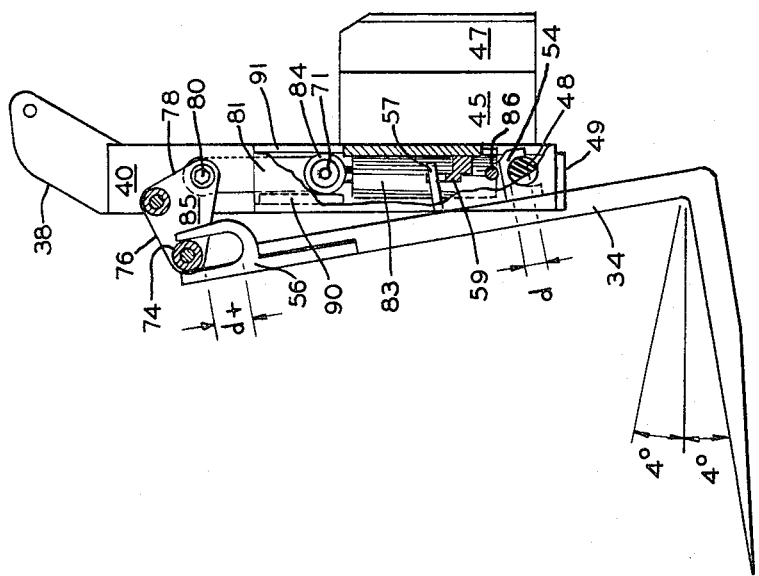
FIG. 4 is an elevation view similar to FIG. 3 but with the forks shown tilted downwardly.
Figure 5:
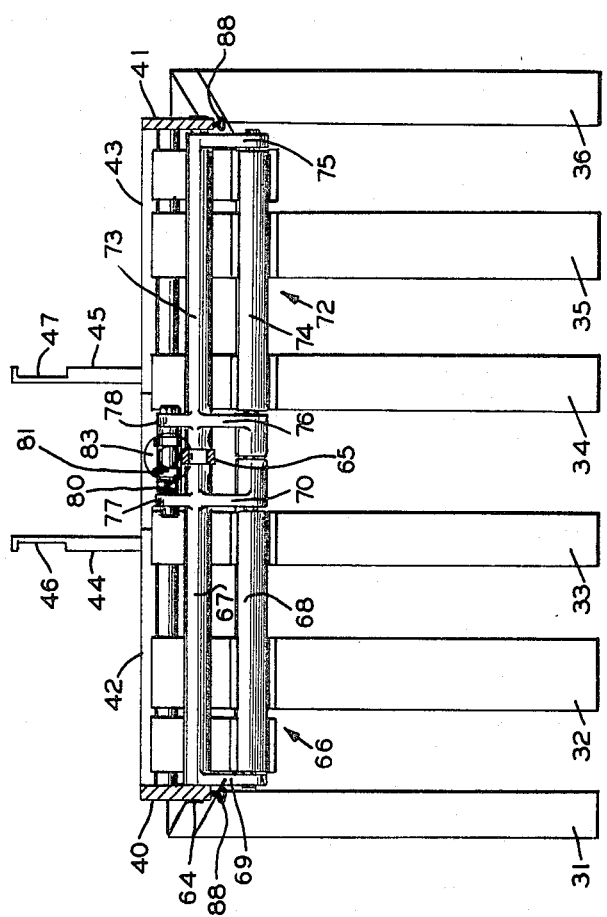
FIG. 5 is a downward section view of the fork carriage assembly taken along lines 5—5 in FIG. 2.

As best seen in FIGS. 2 and 5, upper shaft 64 extends between side plates 40 and 41 and is supported at its center by bearing portion 65 of top cross plate 39. A first tilt lever assembly 66 comprises sleeve 67, journalled on shaft 64 and extending between side plate 40 and bearing 65, and sleeve 68 carried on shaft 71, which shaft is rigidly connected to sleeve 67 by lever plates 69 and 70, to extend parallel to shaft 64. Sleeve 68 nests within the upper yokes of the three forks 31–33 on the operator's right-hand side of the truck. As sleeve 67 of tilt lever assembly 66 rotates about shaft 64, shaft 71 and sleeve 68 move within the upper yokes of forks 31–33 and tilt the forks about the axis of fork hanger bar 48. A similar tilt lever assembly 72 on the left side of the truck includes sleeves 73 and 74, and arms 75 and 76. Sleeve 74 engages the upper yokes of forks 34–36, and tilts these forks as sleeve 73 rotates about shaft 64. In order to rotate the two tilt lever assemblies 66 and 72 about shaft 64, arms 77 and 78 (FIG. 5) attached to sleeves 67 and 73 are connected, by means of bolt 80 and link 81, as better seen in FIGS. 3 and 4, to the movable rod 82 of hydraulic piston-cylinder assembly 83. Crank pin 71 connects the eye end of piston rod 82 to the lower end of connecting link 81, and carries rollers 84, 84, which travel up and down between guide plates 90 and 91, front guide plate 90 being removed in FIG. 2 for ease of illustration. As indicated in FIGS. 3 and 4, arms 76 and 78, which attach sleeve 73 to both bar 74 and link 81, may actually comprise two portions of a single plate 85 which both radially extend from sleeve 73. With the piston-cylinder assembly in a mid-position, as shown in FIG. 3, the fork tips are level. As the piston-cylinder retracts, the fork tips are driven downwardly, to the position shown in FIG. 4. It will be understood that expansion of the piston-cylinder assembly past the position shown in FIG. 3 will tilt the forks upwardly to the position shown in FIG. 7 for example. Tilting of the forks 4 degrees upwardly or downwardly, over a total range of 8 degrees was provided in an exemplary embodiment of the invention. It may be noted that hydraulic power is used for both upward and downward fork tilting rather than allowing gravity or the load to lower the forks, it being particularly necessary in slip-sheet handling that the operator be enabled to press the fork tips tightly against the floor, to "chisel" under the load.

It should be noted that sleeves 68 and 74 act on the fork upper yokes at a considerable lever arm distance from the axis of hanger bar 48, around which all of the forks rotate as the forks are tilted in either direction, and hence little torque is required to tilt the forks with the required amount of force, thereby allowing a small size hydraulic cylinder and/or the use of short arms 76 and 78 on the tilt lever assembly. The latter advantage is appreciable in that it helps obviate any need for increasing the length of the truck.

As best seen in FIG. 2, a removable retainer bar 86 is supported between end plate 41 and intermediate plate 61, and a similar retainer bar 87 extends between end plate 40 and intermediate plate 60, each being held in place by a respective thumbhead setscrew 88 (FIG. 2) in end plate 40 or 41. As best understood from FIGS. 3 and 4, the retainer bars 86 and 87 each pass over the top faces of the hanger blocks 54 of three forks. Retainer bars 86 and 87 each limit upward translation of a trio of forks to a distance less than the amount ($d$ in FIG. 4) which would allow each hanger block 54 to clear the top of hanger bar 48. However, when retainer bars 86 and 87 are removed (merely by loosening their respective thumbscrews and sliding them out lengthwise), it will be seen that each fork then can be lifted upwardly (assuming enough clearance space exists in its upper yoke 56) until its hanger block 54 will clear the top of bar 48, after which the fork may be swung outwardly, rotating the fork in a clockwise direction around roller sleeve 74 as viewed in FIG. 4, and then lowering the fork to remove upper yoke 56 from bar 74.

It will be seen in FIG. 4 that a clearance distance $d+$ equal to or greater than distance $d$ must exist between the bottom of sleeve 74 and the bottom of the slot in yoke 56 in order to allow the fork to be lifted high enough to be removed. It also may be seen that sleeve 74 approaches the mouth of yoke 56 as the fork tip is lowered. Thus one may provide some of the required clearance distance $d+$ by tilting the forks downwardly, and thereby use a shorter slot, and hence provide a stronger yoke.

It will be seen (FIGS. 2 and 5) that the lower end of the hydraulic piston-cylinder assembly is pivotally attached to fork hanger bar 48. While assembly 83 can instead be otherwise connected between the fork carriage frame 26 and the two tilt lever assemblies 66 and 72, the arrangement shown is advantageous in that it requires no increase in the length of the truck and does not interfere with operation of the reach mechanism.

Inasmuch as right and left tilt lever assemblies always rotate together, it will be apparent that various separate parts of these two assemblies could be combined, if desired. A single retainer bar extending all the way across the fork carriage could be substituted for the two separate bars 86 and 87 if the piston-cylinder assembly were shortened or slightly relocated.

An alternative technique for preventing lateral shifting of the individual tines along hanger bar 48 is to provide set screw means (not shown) in each hanger block 54 and cooperating circumferential grooves (not shown) properly spaced along shaft 48, with each set screw protruding into a respective groove, thereby allowing each fork and its hanger block to rotate about shaft 48 but not to translate along shaft 48.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described our invention, what we claim as new and desire to secure by Letters Patent is:

1. A lift-truck fork-carriage assembly, comprising, in combination:

a frame,
a first shaft means extending across said frame;
a plurality of L-shaped tiltable load forks each having a generally vertical back portion and a generally horizontal lower portion, a downwardly-facing lower yoke member bearing on and partially surrounding said first shaft means, and an upwardly-facing upper yoke member, said upper loke member being carried on said back portion above said lower yoke member;
a second shaft means passing through said upper yoke members;
and means for translating said second shaft means to rotate said load forks about the axis of said first shaft means.

2. An assembly according to claim 1 having a removable bar spaced from at least one of said load forks to limit translation of the lower yoke member of said load fork away from said first shaft means.

3. An assembly according to claim 1 having pair of arms mounted to rotate about an axis, said second shaft means being connected to said arms to be translated upon rotation of said arms about said axis, said axis extending parallel to said second shaft means.

4. An assembly according to claim 1 having a plurality of grooves spaced along said first shaft means and in which each of said lower yoke members includes a pin means adapted to protrude into a respective groove to prevent translation of said load fork in a direction along said first shaft means.

5. An assembly according to claim 1 having a further member extending parallel to said first shaft means and provided with a plurality of grooves, and in which each of said load forks includes a pin means adapted to extend into a respective groove to prevent translation of said load fork in a direction along said first shaft means.

References Cited
UNITED STATES PATENTS

| | | |
|---|---|---|
| 2,348,899 | 5/1944 | Guignard et al. |
| 2,463,381 | 3/1949 | Hicks. |
| 2,625,278 | 1/1953 | Sensenbaugh _____ 214—700 X |

GERALD M. FORLENZA, *Primary Examiner.*

R. BALLANTYNE, *Assistant Examiner.*